United States Patent
Trösch

[11] 3,802,462
[45] Apr. 9, 1974

[54] REMOTELY OR MANUALLY OPERABLE MEMBRANE VALVE

[75] Inventor: Paul Trösch, Schaffhausen, Switzerland

[73] Assignee: Georg Fischer Aktiengesellschaft, Schaffhausen, Switzerland

[22] Filed: Aug. 10, 1972

[21] Appl. No.: 279,687

[30] Foreign Application Priority Data
Aug. 18, 1971 Switzerland................ 12140/71

[52] U.S. Cl.............. 137/556, 251/14, 251/60, 251/61.1, 251/331
[51] Int. Cl............... F16k 37/00, F16k 31/145
[58] Field of Search........... 251/331, 61.1, 60, 14; 137/556

[56] References Cited
UNITED STATES PATENTS
| R19,151 | 5/1934 | Saunders | 251/331 |
|---|---|---|---|
| 3,011,758 | 12/1961 | McFarland, Jr. | 251/331 |
| 3,067,764 | 12/1962 | Geary | 251/331 X |
| 2,658,711 | 11/1953 | Anderson | 251/331 X |

Primary Examiner—Arnold Rosenthal
Attorney, Agent, or Firm—Flynn & Frishauf

[57] ABSTRACT

A housing has a membrane stretched thereacross, the membrane being deflectable towards a flow opening which has an intermediate separating ridge; when the membrane is deflected against the separating ridge, flow communication through the flow opening is interrupted. This deflection can be effected either upon application of a pressure medium to the other side of the membrane, or manually, by moving a counter pressure cup against the other side of the membrane. Movement of the counter pressure cup is obtained, for example, by a spindle threaded into the housing and operable by a removable hand wheel. The membrane, preferably, is formed with an upstanding bolt entering into the spindle, the spindle being made of transparent material so that the position of the membrane can be visually inspected by checking the position of the bolt within the spindle.

6 Claims, 4 Drawing Figures

REMOTELY OR MANUALLY OPERABLE MEMBRANE VALVE

The present invention relates to a membrane valve for liquid or gaseous fluids, and more particularly to such a valve which is both remotely operable by a pressure medium, as well as manually.

Membrane valves have previously been proposed in which a membrane is stretched across a housing which forms part of a fluid channel, the housing being formed with a separating ridge. If the membrane is deflected towards the separating ridge, fluid communication through the housing is interrupted. This deflection of the membrane can be caused by a pressure medium which is applied to the other side of the membrane. Preferably, the membrane is secured in the housing by being clamped between flanges thereof.

Such arrangements have the disadvantage that, if the control fluid pressure should fail, the valve cannot be closed; that is, if automatic operation of the valve fails, operation of the valve is no longer possible.

It is an object of the present invention to provide a valve which has the advantages of a pressure operated valve and which additionally incorporates means to permit it to be manually operated in case of failure of operating pressure fluid, and in which, additionally, the amount of fluid passed by the valve can be continuously variably controlled.

SUBJECT MATTER OF THE PRESENT INVENTION

Briefly, the housing is provided with inlet and outlet openings which extend towards an intermediate separating ridge, the membrane being located within the housing so that one side thereof can be deflected towards the separating ridge to interrupt fluid communication, by applying a pressure medium to the other side of the membrane. In order to permit manual operation, a pressure cup is located at the other side of the membrane, the pressure cup being movable therein by an operative connection accessible from the outside of the housing. In a preferred form, the operative connection includes a spindle threaded into the housing which can be operated by a removable hand wheel to move the pressure cup against the membrane and to deflect the membrane towards the separating ridge, in a limiting movement, engaging the separating ridge for complete interruption of fluid communication between inlet and outlet.

The invention will be described by way of example with reference to the accompanying drawings, wherein.

Figure 1:
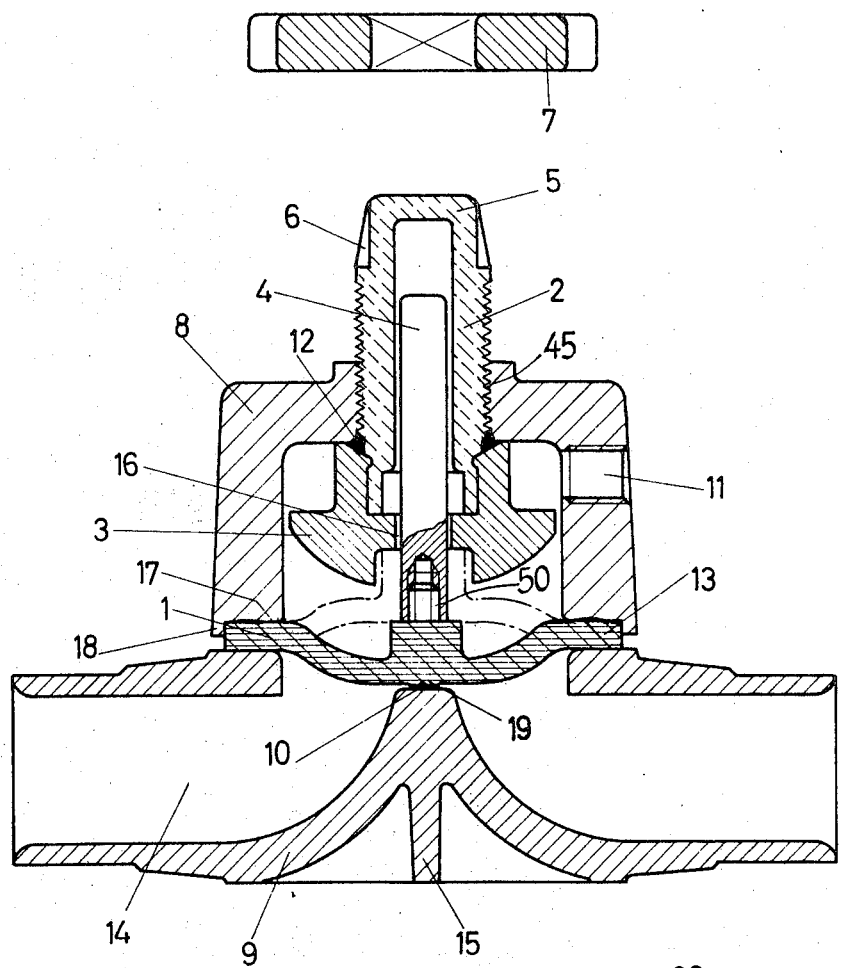
FIG. 1 is a partly exploded longitudinally cross-sectional view through the valve along an axis of symmetry.

A stretched pre-formed elastic membrane 1 is located between an upper housing portion 8 and a lower housing portion 9. The membrane 1 is clamped at its edge portion 13 between the housing portions 8, 9, the lower housing portion 9 being shaped to form a flow channel for gaseous or liquid fluid media to be controlled by the valve A separating ridge 10 is located in the flow path 14 intermediate the inlet and outlet of the valve. FIG. 1 illustrates the valve in closed position, in which the membrane 1 engages the tip of the separating ridge, thereby interrupting flow of the fluid medium. The lower housing portion 9 is box-like, for example with square or rectangular cross section, at least in the region intermediate the inlet and outlet openings and connections for the fluid medium. A stiffening rib 15 is located beneath the separating ridge 10. The upper housing portion 8 forms a cap of cross-sectional shape similar to that of the lower housing portion, for example square, and is secured to the lower housing portion 9 by suitable means for example by screws (not shown). The edge 17 of the upper portion 8 is formed with a shoulder 18 matching the outer circumference of the membrane. A threaded spindle 2 is located in the upper housing portion 8 to be longitudinally movable therein.

The center of the membrane 1 is removably connected by a molded-in screw 50 to an upstanding bolt 4 which fits through a bore 16 formed in a pressure cap 3. Spindle 2 is a hollow cylinder and bolt 4 extends therein. Preferably, the threaded spindle 2 is made of transparent material so that bolt 4, preferably of opaque material or of contrasting color, can be seen through the spindle so that a visual indication of the position of the membrane 1 is externally visible. The upper end 5 of spindle 2 is formed with suitable engagement surfaces 6 for a hand wheel 7. The pressure cap 3 is rotatably connected with respect to the spindle 2 and secured thereto. Pressure cap 3 is shaped in the form of a spherical section matching the shape of the membrane 1 when it engages the separating ridge 10. The upper portion of the pressure cap 3 can be shaped in any suitable manner. A sealing ring 12 is secured between spindle 2 and pressure cap 3. The threaded portion of spindle 2 is sealed to the upper portion 8 of the housing by any suitable means; preferably, a tape 45 of polytetrafluorethylene (Teflon) is used for sealing.

A threaded bore 11 in housing 8 is connectable to a pressure medium, derived from a control source, in order to introduce pressure fluid into the upper part of housing 8 to move membrane 1, under automatic operation.

Figure 2:
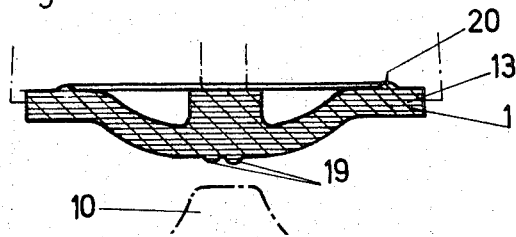
FIG. 2 is a schematic cross-sectional view through the membrane illustrating its relationship to the separating ridge.

Membrane 1 is best seen in cross section in FIG. 2. In a preferred form, the membrane has a pair of sealing projections or rings 19 formed at the side facing the separating ridge 10, the sealing bulges or ridges 19 extending parallel to the sealing surface of the ridge 10. Depending on the width of the ridge 10, one or more such bulges 19 may be used, two being shown in FIG. 2. At the other side of membrane 1, a sealing ridge 20 is formed bulging upwardly, and located near the outer rim 13 of the membrane. Ridge 20 is so located that it fits along the surface 17 of the upper housing portion 8. Depending on the width of the surface 17, one or more such sealing ridges 20 can be placed at the terminal end portion 13 of the membrane, at the side opposite the one facing the flow duct 14.

Operation: In normal, automatic operation, control pressure fluid is admitted to the upper part of housing 8 through opening 11. This pressure fluid may be liquid or gaseous. The excess pressure in the upper housing 8 deflects the elastic membrane in the direction of the separating ridge 10, until, in a limiting position, the membrane will deform such that the center portion of the membrane, for example the sealing ridges 19 (FIG. 2) fit against the separating ridge 10 to completely interrupt fluid flow through duct 14. Fluid flow will remain interrupted for so long as control fluid pressure is available through opening 11. Upon release of fluid pressure in opening 11, the inherent tension of the membrane will cause deformation in its rest position, that is, until the membrane will fit against the pressure cap 3, shown in chain-dotted outline in FIG. 1.

If the valve is to be closed but control pressure fluid has failed through opening 11, for example due to a defect or break in the control line, breakdown of the control unit or the like, manual operation can be effected by moving the spindle 2 manually. The hand wheel 7 is placed on the engagement surfaces 6 at the upper part 5 of the spindle, and the spindle screwed downwardly. The pressure cap 3 will thereupon engage the membrane and deform the membrane, resiliently, so that the membrane will inhibit flow through the duct 14 and, in a limiting position, totally interrupt flow when the membrane has seated against the separating ridge 10.

Manual operation also permits setting of the valve to intermediate flow positions while under automatic operation. By partly moving the spindle downwardly, the membrane can deflect upwardly only to a limited extent so that the amount of flow through duct 14 can be regulated, shut-off of the valve being obtained automatically under control of fluid flow through opening 11, or manually, by operation of hand wheel 7. The pressure cap 3 is shaped to fit the outline of the membrane when in complete sealing position; when the membrane is in intermediate position, the shape of the pressure cap 3 assists in maintaining the membrane in stretched position in the housing.

Figure 3:
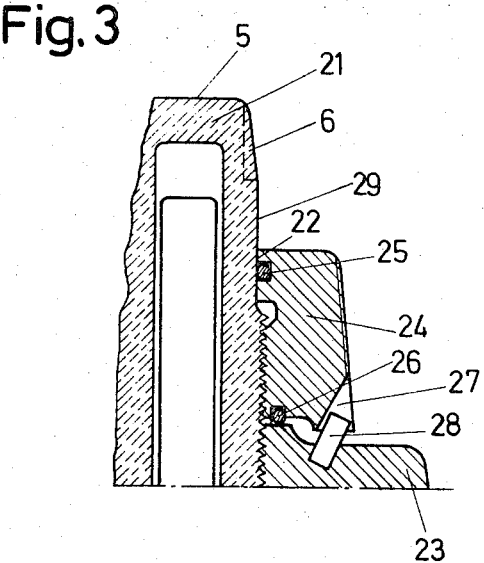
FIG. 3 is a fragmentary cross-sectional view illustrating a modification of the operating structure of FIG. 1.

FIG. 3 illustrates a different embodiment, in fragmentary view, of a spindle arrangement. Spindle 21 is rotatable in the upper housing portion 23. A cylindrical element 29 extends upwardly from the spindle 21, without having any threads thereon. The upper end 5 of the spindle 21 has, similar to spindle 2, engagement surfaces 6 for hand wheel 7 (not shown in FIG. 3). A threaded ring 24 is screwed on the spindle over the portion of the spindle extending over the housing part 23. A sealing ring 26 is located between the housing portion 23 and ring 24; a second sealing ring 25 is located between ring 24 and the unthreaded upper portion 29 of the spindle 21. Sealing ring 25 functions not only as a sealing element but additionally as an arresting element or friction brake for spindle 21. Ring 24 can be thought of as a counter nut to arrest movement of the spindle 21, and to lock the spindle 21 in position; to effect such locking, the outer circumference of the ring 24 is formed at selected positions with grooves 27 into which pins can be placed to limit the movement of the ring 24 with respect to the upper portion of the housing 23. The outer surface of the ring 24, preferably, is knurled.

Figure 4:
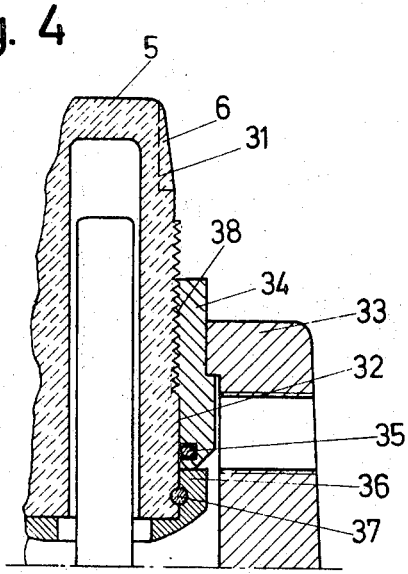
FIG. 4 is a fragmentary cross-sectional view illustrating another modification of the structure of FIG. 1.

Another embodiment of the spindle arrangement is illustrated in FIG. 4. A spindle 31 is rotatably guided in a bushing 34 which is fixed in the upper housing portion 33. Bushing 34 is internally threaded, as seen at 38, cooperating with the thread of the spindle, and is formed with an unthreaded portion 32, coaxial with the spindle. A sealing ring 35 is secured in bushing 34 in the unthreaded portion to act both as a seal and as a brake and arresting device of the spindle. The lower end of the spindle 31 is formed with the pressure cap 36. Pressure cap 36 is axially secured in position by one, or more locating pins 37, extending tangentially with respect to the wall of the bore. The outer shape of the pressure cap 36 is similar to that of pressure cap 3 of FIG. 1. The upper end 5 of spindle 31 is formed with engagement surfaces 6 for a hand wheel 7, similar to FIG. 1.

Operation of the embodiments in accordance with FIGS. 3 and 4 is identical to that of the embodiment of FIG. 1.

The hand wheel preferably is removable in order to prevent unauthorized operation of the spindle and of the valve. The threaded ring 24 of FIG. 3 is particularly suitable to limit the movement of the spindle and to set the maximum excursion of the spindle in intermediate positions of its overall path, by twisting ring 24, after the spindle has been set, against the spindle by the amount limited by the pin 28 set into the upper housing portion 23.

The valve in accordance with the present invention has the particular advantage that, although it is primarily an automatically operating valve, closing upon being subjected to a control pressure medium, it can still be operated manually in case automatic operation should fail. Additionally, the flow through the valve can easily be limited by setting the maximum excursion of the membrane, that is, by setting the permitted deflection of the membrane by suitably locating the pressure cap 3 by rotation of the spindle towards the membrane.

Various changes and modifications may be made within the inventive concept.

I claim:

1. Remotely operable and manually operable membrane valve for fluid media comprising
   a housing;
   a membrane (1) stretched across the housing;
   inlet and outlet openings located at one side of the membrane in the housing, a separating ridge (10) separating the inlet and outlet openings, deflection of the membrane towards said separating ridge controlling flow of the fluid medium through the valve;
   means admitting a control fluid to the other side of the membrane to control deflection thereof;
   a pressure cap (3);
   an upstanding bolt (4) secured to the membrane (1); and a hollow, transparent threaded spindle (2) surrounding the bolt (4) located at the other side of the membrane and engaging said pressure cap, said spindle being threaded in said housing, accessible from outside of the housing and effecting movement of the pressure cap (3) towards the membrane (1) to control deflection of the membrane towards and away from the separating ridge (10) and to permit visual inspection of the position of the bolt (4) and hence of the membrane (1).

2. Valve according to claim 1, wherein the threaded spindle (2) is shaped to permit removably placing a handle thereon.

3. Valve according to claim 1, further comprising means (45, 25, 35) to arrest movement of the spindle (2) with respect to the housing (8).

4. Valve according to claim 1, wherein the housing is a two-part housing having a first part including said inlet and outlet means and said duct, and a second part facing the other side of the membrane;

and sealing means are provided sealing the spindle into said second part.

5. Valve according to claim 4, wherein the sealing means comprises a Teflon tape.

6. Valve according to claim 1, wherein friction means (45, 25, 35) are provided frictionally engaging said spindle (2) and arresting said spindle in a predetermined position in said housing to control deflection of the membrane (1) under action of differential pressure within said housing and within said duct.

* * * * *